(12) United States Patent
Yamaguchi et al.

(10) Patent No.: US 8,284,671 B2
(45) Date of Patent: Oct. 9, 2012

(54) DATA TRANSMITTING AND RECEIVING SYSTEM, TERMINAL, RELAY DEVICE, AND DATA TRANSMITTING METHOD

(75) Inventors: Takao Yamaguchi, Osaka (JP); Atsushi Yoshida, Osaka (JP); Tomoki Ishii, Osaka (JP)

(73) Assignee: Panasonic Corporation, Osaka (JP)

( * ) Notice: Subject to any disclaimer, the term of this patent is extended or adjusted under 35 U.S.C. 154(b) by 172 days.

(21) Appl. No.: 12/529,620

(22) PCT Filed: Dec. 9, 2008

(86) PCT No.: PCT/JP2008/003667
§ 371 (c)(1),
(2), (4) Date: Sep. 2, 2009

(87) PCT Pub. No.: WO2009/075097
PCT Pub. Date: Jun. 18, 2009

(65) Prior Publication Data
US 2010/0097924 A1    Apr. 22, 2010

(30) Foreign Application Priority Data
Dec. 12, 2007   (JP) ................................. 2007-321306

(51) Int. Cl.
*H04J 1/16*   (2006.01)
(52) U.S. Cl. .................................................. 370/236.2
(58) Field of Classification Search ........... 370/228–253
See application file for complete search history.

(56) References Cited

U.S. PATENT DOCUMENTS 5,515,359 A * 5/1996 Zheng ............................ 370/231
6,052,734 A * 4/2000 Ito et al. ........................ 709/235
(Continued)

FOREIGN PATENT DOCUMENTS

JP    2000-115137    4/2000
(Continued)

OTHER PUBLICATIONS

International Search Report issued Mar. 10, 2009 in International (PCT) Application No. PCT/JP2008/003667, filed Dec. 9, 2008.

(Continued)

*Primary Examiner* — Andrew Lai
*Assistant Examiner* — Juvena Loo
(74) *Attorney, Agent, or Firm* — Wenderoth Lind & Ponack, L.L.P.

(57) ABSTRACT

A terminal includes a transmitting and receiving unit transmitting and receiving an observation packet for observing the transmission quality and data, and a transmission quality managing unit (i) exchanging the observation packet with another terminal via the transmitting and receiving unit, (ii) observing a loss rate of the data between the terminal and the other terminal and writing to the observation packet the degraded state information indicating the loss rate in the case where the terminal receives the data, and (iii) subtracting the congested state information from the degraded state information included in the observation packet collected from the other terminal in order to calculate a transmission error rate of the data in the terminal and the relay device in the case where the terminal transmits the data. An error correction code processing unit determines a forward error correction capability based on the transmission error rate calculated by the transmission quality managing unit and assigns to the data to be transmitted the forward error correction code according to the forward error correction capability.

12 Claims, 14 Drawing Sheets

U.S. PATENT DOCUMENTS

| | | | |
|---|---|---|---|
| 6,751,195 B1* | 6/2004 | Watanabe | 370/236.1 |
| 7,107,498 B1 | 9/2006 | Schmidt et al. | |
| 7,545,744 B2* | 6/2009 | Zeitak | 370/230.1 |
| 7,729,347 B2* | 6/2010 | Rosberg | 370/389 |
| 2002/0053053 A1 | 5/2002 | Nagai et al. | |
| 2002/0136164 A1 | 9/2002 | Fukuda et al. | |
| 2002/0191594 A1* | 12/2002 | Itoh et al. | 370/352 |
| 2003/0231589 A1* | 12/2003 | Itoh et al. | 370/230 |
| 2004/0114576 A1* | 6/2004 | Itoh et al. | 370/352 |
| 2005/0180415 A1* | 8/2005 | Cheung et al. | 370/389 |
| 2005/0257111 A1 | 11/2005 | Nagai et al. | |
| 2006/0015783 A1 | 1/2006 | Nagai et al. | |
| 2006/0069799 A1* | 3/2006 | Hundscheidt et al. | 709/232 |
| 2006/0085725 A1 | 4/2006 | Nagai et al. | |
| 2006/0153225 A1* | 7/2006 | Kamiya | 370/463 |
| 2007/0008883 A1* | 1/2007 | Kobayashi | 370/230 |
| 2007/0223449 A1 | 9/2007 | Nagai et al. | |
| 2007/0223503 A1 | 9/2007 | Nagai et al. | |
| 2007/0223583 A1 | 9/2007 | Nagai et al. | |
| 2007/0223584 A1 | 9/2007 | Nagai et al. | |
| 2007/0223586 A1 | 9/2007 | Nagai et al. | |
| 2007/0263535 A1* | 11/2007 | Shabtay | 370/230 |
| 2008/0049620 A1* | 2/2008 | Riga et al. | 370/236 |
| 2008/0056177 A1* | 3/2008 | Mori et al. | 370/318 |
| 2008/0184081 A1* | 7/2008 | Hama et al. | 714/708 |
| 2009/0219990 A1* | 9/2009 | Han et al. | 375/240.02 |

FOREIGN PATENT DOCUMENTS

| | | |
|---|---|---|
| JP | 2001-160824 | 6/2001 |
| JP | 2001-230809 | 8/2001 |
| JP | 2002-204278 | 7/2002 |
| JP | 2002-325095 | 11/2002 |
| JP | 2003-152752 | 5/2003 |
| JP | 2004-153617 | 5/2004 |
| JP | 2005-110294 | 4/2005 |
| JP | 2005-523619 | 8/2005 |
| JP | 2005-252496 | 9/2005 |
| JP | 2005-347879 | 12/2005 |
| JP | 2006-197288 | 7/2006 |
| WO | 03/090083 | 10/2003 |

OTHER PUBLICATIONS

Tomoaki Itoh et al., "Denso Kankyo no Hendo ni Taisei no aru Fugoka • Denso Seigyo Hoshiki (Adaptive Encoding/Transmission Control Method for Transmission Environment Fluctuation)", IEICE Technical Report, Information Networks (IN), Jan. 5, 2001, vol. 100, No. 536, IN2000-172, pp. 43-48.

J. Lacan et al., "Reed-Solomon Forward Error Correction (FEC)", draft-ietf-rmt-bb-fec-rs-01.txt, Jun. 23, 2006.

K. Ramakrishnan et al., "A Proposal to add Explicit Congestion Notification (ECN) to IP", rfc2481.txt, Jan. 1999.

* cited by examiner

DATA TRANSMITTING AND RECEIVING SYSTEM, TERMINAL, RELAY DEVICE, AND DATA TRANSMITTING METHOD

BACKGROUND OF THE INVENTION

1. Technical Field

The present invention relates to a data transmitting and receiving system performing transmission and reception of data between terminals connected to a network via a relay device.

2. Background Art

There have been proposed techniques to realize packet communications reducing delay in an environment of a network (typically referred to as an ad-hoc network, or a mesh-type network) which entirely consists of wirelessly connectable terminals (personal computer), the Personal Digital Assistant (PDA), cellular phone, and car navigation system), and dispenses with an access point such as a wireless Local Area Network (LAN). One of such techniques, for example, is a route switching technique which sets routes between transmitting and receiving terminals and periodically provides a control packet to each of the routes in order to measure an end-to-end delay, select one of the routes always having the least delay, and transmit a packet.

This ad-hoc network, however, has a long transmission delay problem. Besides, the ad-hoc network suffers another problem of data loses caused by the buffer overflow at a relay device interconnecting the terminals and the resulting congestion, and by occurrence of a transmission error since interconnections are established between relaying devices, and a relay device and a transmitting and receiving terminals.

Hence, occurrence of the data losses caused by the congestion and the transmission error leads to problems of video and audio data quality degradation including a distorted image and skipping sound when transmitting the video and the audio data.

Specifically, determination is to be made in that which cause, the congestion or the transmission error both developing the data losses when conducting wireless transmission, influences the data loss to what degree.

In order to overcome the problems, a possible technique is to apply i) a technique (Patent Reference 2) for setting a transmission rate and intensity of an error correction code, distinguishing between the transmission error and the congestion, by periodically transmitting an observation packet to ii) a technique (Patent Reference 1) for correctly measuring a traffic amount at the routing device by the periodical transmission of an observation packet for observing transmission quality between the transmitting and receiving terminals in the ad-hoc network.

Patent Reference 1: Japanese Unexamined Patent Application Publication No. 2005-347879
Patent Reference 2: Japanese Unexamined Patent Application Publication No. 2003-152752

SUMMARY OF THE INVENTION

In Patent Reference 1, the observation packet for observing transmission quality is relayed typically among plural stages of relay devices. Hence, the increasing number of the stages of the relay devices relaying the observation packet leads to a longer packet length of the observation packet, developing overheads such as an analysis of a packet detail and a communication volume.

In addition, a system involving a multistage relay and dynamic determination of a transmission path, including a wireless ad-hoc network, faces problems such that assuming a congested relay device is challenging and specifying the congested relay device is difficult.

The present invention is conceived in view of the above problems and has as an objective to provide data transmitting and receiving system, in an ad-hoc network, to effectively transmit an observation packet, to be able to specify a congested relay device, and to realize high quality transmission of data.

Means to Solve the Problems

In order to achieve the above objective, a data transmitting and receiving system includes: a relay device which is connected to a network; and a first terminal and a second terminal each of which transmits and receives data via the relay device, wherein the relay device includes: a receiving unit which receives an observation packet used for observing transmission quality, and data; a reception buffer in which the data is stored; a reception buffer managing unit which observes a loss rate of the data in the reception buffer; a packet information rewriting unit which writes the loss rate into the observation packet as congested state information, the loss rate being observed by the reception buffer managing unit.

A transmission buffer stores on a destination basis the data stored in the reception buffer; a transmission buffer managing unit forwards the data stored in the transmission buffer at a predetermined transmission rate on the destination basis; and a transmitting unit transmits towards a destination the data forwarded by the transmission buffer managing unit, and the observation packet.

The first terminal includes: a first transmitting and receiving unit which transmits and receives data and the observation packet; and a first transmission quality managing unit which writes degraded state information in the observation packet, the degraded state information indicating the loss rate of the data between the first terminal and the second terminal.

The second terminal includes: a second transmitting and receiving unit which transmits and receives data and the observation packet; a second transmission quality managing unit which calculates a transmission error rate of the data in the data transmitting and receiving system by subtracting the loss rate indicated in the congested state information from the loss rate indicated in the degraded state, the loss rates being included in the observation packet obtained from the first terminal; and an error correction processing unit which executes processing on data to be transmitted, so that an error of the data is corrected when the data is received, the processing being executed according to the transmission error rate calculated by the second transmission quality managing unit.

According this structure, the observation packet is transmitted from a transmitting terminal (the second terminal) toward a receiving terminal (the first terminal) via the relay device. Upon receiving the observation packet, the relay device writes into the observation packet congested state information indicating a data loss rate at the relay device, and relays the observation packet. Further, the receiving terminal writes into the observation packet the degraded state information indicating the data loss rate between the two terminals, and returns the observation packet to the transmitting terminal.

Thus, the transmitting terminal can specify a congested relay device, using the congested state information written into the observation packet. In addition, subtracting the congested state information from the degraded state information makes possible calculating a transmission error in the data transmitting and receiving system. By providing processing to data to be transmitted for correcting an error of the data in the transmitting according to the transmission error rate, a high-quality transmission can be realized. Further, a length of the observation packet is independent from the number of stages to be relayed. Thus, efficient transmission of the observation packet is also possible.

Preferably, the first terminal further includes a first terminal reception state managing unit which detects a change of a reception state of the data in the first transmitting and receiving unit, and, in the case where the change of the reception state is determined, to instruct the first transmission quality managing unit to transmit the observation packet.

The second terminal further includes a second terminal reception state managing unit which detects a change of a reception state of the data in the second transmitting and receiving unit, and, in the case where the change of the reception state is determined, to instruct the second transmission quality managing unit to transmit the observation packet, the first transmission quality managing unit transmits, via the first transmitting and receiving unit, the observation packet towards a terminal of a destination of the data in response to the instruction from the first terminal reception state managing unit so as to transmit the observation packet, and the second transmission quality managing unit transmits, via the second transmitting and receiving unit, the observation packet towards a terminal of a destination of the data in response to the instruction from the second terminal reception state managing unit so as to transmit the observation packet.

In addition, the relay device further includes a relay device reception state managing unit which detects a change of a reception state of the data in the receiving unit, and, in the case where the change of the reception state is determined, to instruct the second transmission quality managing unit so as to transmit the observation packet, and the second transmission quality managing unit transmits, via the second transmitting and receiving unit, the observation packet towards the first terminal in response to the instruction from the relay device reception state managing unit so as to transmit the observation packet.

This structure allows the transmitting terminal to transmit the observation packet when a change occurs in a reception state of the data. This allows the transmitting terminal to avoid transmitting unnecessary observation packets, so that loads delivered to the network, the terminals and the relay device can be reduced.

Further preferably, in the case where the receiving unit receives within a predetermined time period a plurality of instructions including the instruction for transmitting the observation packet from a same source to a same destination, the relay device reception state managing unit is characterized to execute one of the instructions on the second transmission quality managing unit, and to discard remaining instructions out of the instructions.

When receiving plural instructions for transmitting an observation packet to be transmitted from the same source to the same destination in a short period of time, the relay device keeps one of the trigger packets and discards the rest. This can prevent two or more trigger packets having instructions with the same details from being transmitted towards the transmitting terminal. This can alleviate loads delivered to the network, the terminal, and the relay device.

It is noted that the present invention can be implemented in a form of a data transmitting method realizing characteristic units in the data transmitting and receiving system as steps, and a program causing a computer to execute a characteristic steps included in the data transmitting method, in addition to a form of the data transmitting and receiving system including the above characteristic units. As a matter of course, such a program can be distributed via a storage media including a Compact Disc-Read Only Memory (CD-ROM), and a communications network including the Internet.

In a wireless ad-hoc network, a transmitting apparatus can specify a congested relay device, using congested state information written in an observation packet. Further, the transmitting apparatus can obtain a transmission error rate, using degraded state information and the congested state information. By providing processing to data to be transmitted for correcting an error of the data in the transmitting according to the transmission error rate, a high-quality transmission can be realized.

NUMERICAL REFERENCES

Figure 1:
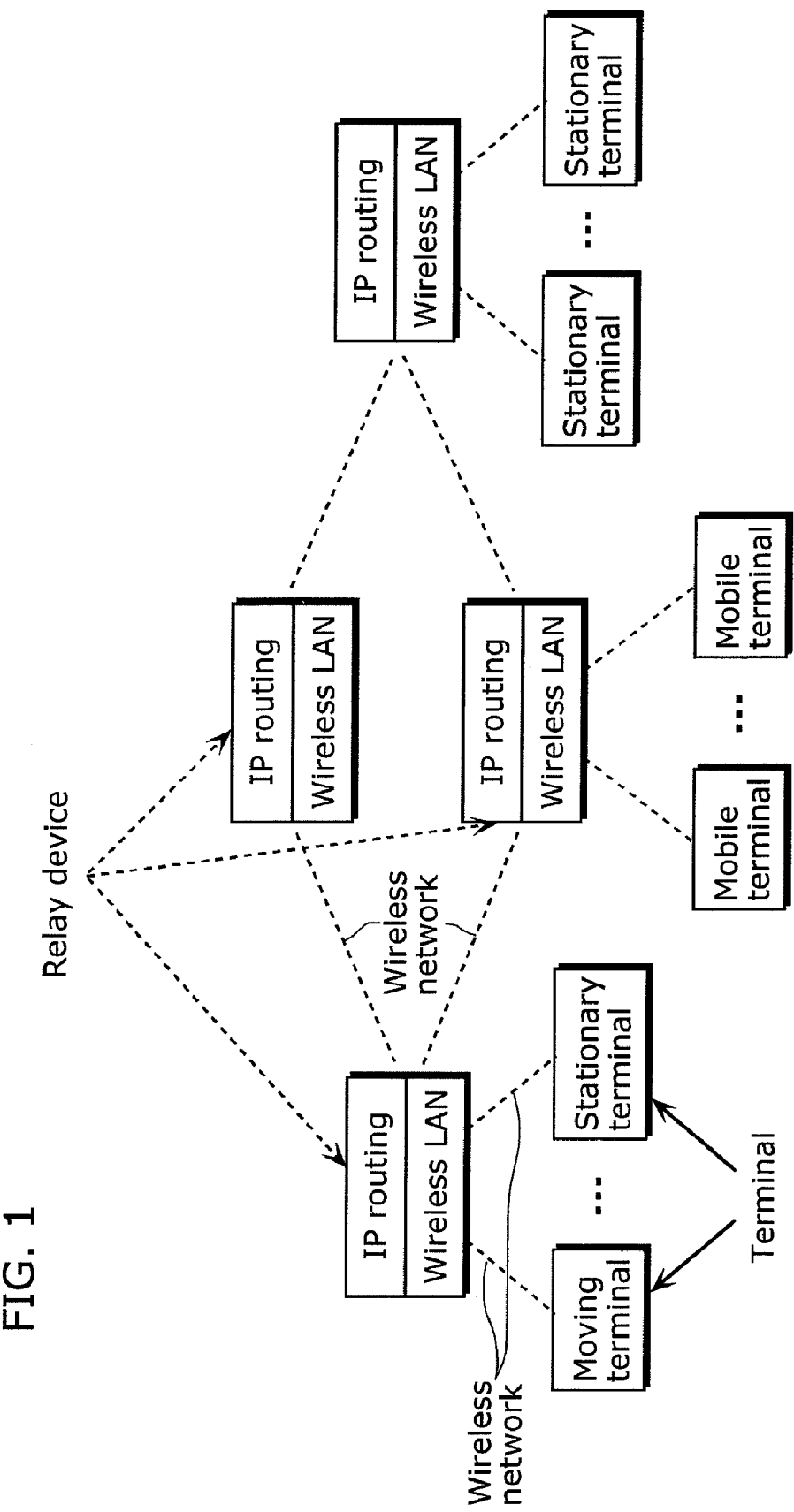
FIG. 1 illustrates a structure of a network intended in the present invention.

901 Displaying unit
902 Decoding unit
903 Input unit
904 Transmission rate controlling unit
905 Error correction code processing unit
906 Transmission quality managing unit
907 and 1005 Reception state managing unit
908 Transmitting and receiving unit
1001 Receiving unit
1002 Reception buffer managing unit
1003 Packet information rewriting unit
1004 Destination distributing unit
1006 Routing processing unit
1007 Transmission buffer managing unit
1008 Transmitting unit
1010 Trigger packet image
1020 Reception state managing table

DETAILED DESCRIPTION OF THE INVENTION

Described hereinafter is an embodiment of the present invention with reference to the drawings.

FIG. 1 illustrates a structure of a network intended in the present invention.

As shown in FIG. 1, terminals are connected to a relay device. Each of relay devices forms an ad-hoc network on a wireless network, and is interconnected with a terminal on a wire network.

A relay device interconnecting the wireless network and the wire network is also referred to as a gateway. Plural gateways or no gateways may be utilized.

Each of the relay devices, having a routing function, establishes interconnections between the relay apparatuses in the wireless ad-hoc network, and the relay device and the wire network. Here, the routing function means selecting the most appropriate route from a transmitting terminal to a receiving terminal in order to transmit data via the relay device.

The routing function may be achieved in an Internet Protocol (IP) packet level, or in a datalink layer, such as the Institute of Electrical and Electronic Engineers (IEEE) 802.11s. The routing function may be implemented on a routing protocol. Typical protocols are the Dynamic Source Routing (DSR) Protocol and the Ad hoc on-demand Distance Vector (AODV). In general, the routing protocol generates path information.

Each of the terminals shown in FIG. 1 includes a camera and a Personal Computer (PC). Here, no designated kind or performance of the terminal, such as a cell phone, a TV, and a car navigation system, may be defined. Further, the terminal may be mobile or stationary.

The wireless network includes a wireless LAN, the Dedicated Short Range Communication (DSRC), and a cellular phone network. Thus no designated kind or performance is defined for the wireless media. Similarly, the wire network includes a fiber optical network, the Public Switched Telephone Networks (PSTN), and the LAN. Thus no designated kind or performance is defined for the wire network media.

The network shown in FIG. 1 is applicable to transmitting various media, such as text, a still picture, music, and control data, as well as transmitting a video and a speech. Further, the network in FIG. 1 is subject to no limited usage locations, and covers an in-house high-quality medium as well as an outside medium for transmission.

Figure 2:
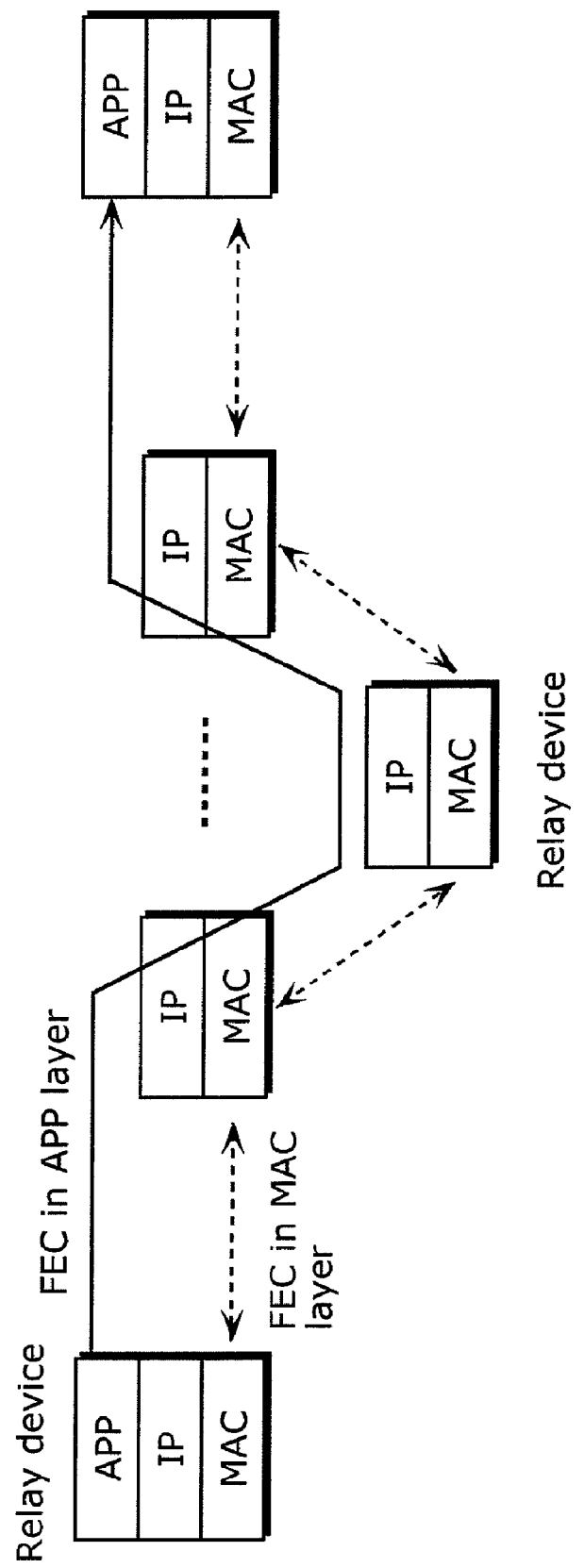
FIG. 2 illustrates a forward error correction code used by a transmitting and receiving terminal.

FIG. 2 illustrates a forward error correction code used by a transmitting and receiving terminal.

Retransmission of a transmission packet and utilization of the Forward Error Correction (FEC) has been adopted in order to normally recover a transmission packet developing a transmission packet loss and a bit error due to congestion and a transmission error.

The FEC is a technique to add redundant information to information intended to be transmitted in order to correct, based on the redundant information, an error of information developed during the transmission. The error correction capability improves as an error correction code becomes longer. After the correction, however, the information having the longer error correction code is slower in transmission speed than information with no error correction when transmitting at the same speed.

The most suitable length of an error correction code depends on reliability of a communication path; meanwhile, correction capability may vary, among error correction codes having the same length, according to an algorithm (difference in format). Exemplified as error correction code techniques are the Reed-Solomon code, a block code represented by the Bose-Chaudhuri-Hocquenghem (BCH) code, and a convolutional code represented by the Vitrbi code. Another example of the error correction code techniques is described in Patent Reference: Japanese Unexamined Patent Application Publication No. 2000-115137 with reference to H.223 (the standard which defines techniques for multiplexing moving picture data, audio data, and communications data, in videophones, recommended by the ITU). The introductory part of the background art in Patent Reference emphasizes on the necessity of a technique selecting a level of error resilience depending on a condition of a transmission path.

Specifically described next is a technique for utilization of the FEC in the present invention.

A protocol layer which the FEC is provided includes the application layer and the data link layer.

FIG. 2 exemplifies the FEC to be provided to entire coded AV data in the application layer. Each of nodes (a device indicating the use of at least the IP layer and the MAC layer), corresponding to one relay device, shows a network protocol layer to be used.

Internet Drafts (a series of working documents in the Internet), for example, define a technique for utilization of an error correction code in the application layer with reference to Non-Patent Reference: Reed-Solomon Forward Error Correction (FEC), draft-ietf-rmt-bb-fec-rs-01.txt. Internet Drafts also define the fact that selection for correction capability is available.

A missing block due to the congestion is recovered by the receiving terminal with a use of the FEC (referred to as FEC in the APP (Application) layer in FIG. 2) provided in the application layer.

Moreover, the data link layer involves dividing data from the application layer into blocks, and providing the FEC (referred to as FEC in the Media Access Control (MAC) layer in FIG. 2) to each of the blocks in order to give resilience against the bit error occurred during the transmission.

For example, the IEEE802.11a defines the convolutional coding, the Vitabi coding, and a use of intra-symbol interleave. The convolutional code has a constraint length of 7, and is defined to be selected out of 1/2, 2/3, and 3/4 in code rate.

The FEC in the application layer is used to recover a packet loss developed due, to the congestion and the transmission error between the transmitting and receiving terminals. Meanwhile, the FEC in the data link layer is used to recover a packet loss developed due to the transmission error between relay devices.

Further, selection of presence or absence in setting, a technique, and intensity of the error correction code is available in each of layers; however, no definition is provided for selecting the technique and the intensity specifically in what timing and how.

Figure 3:
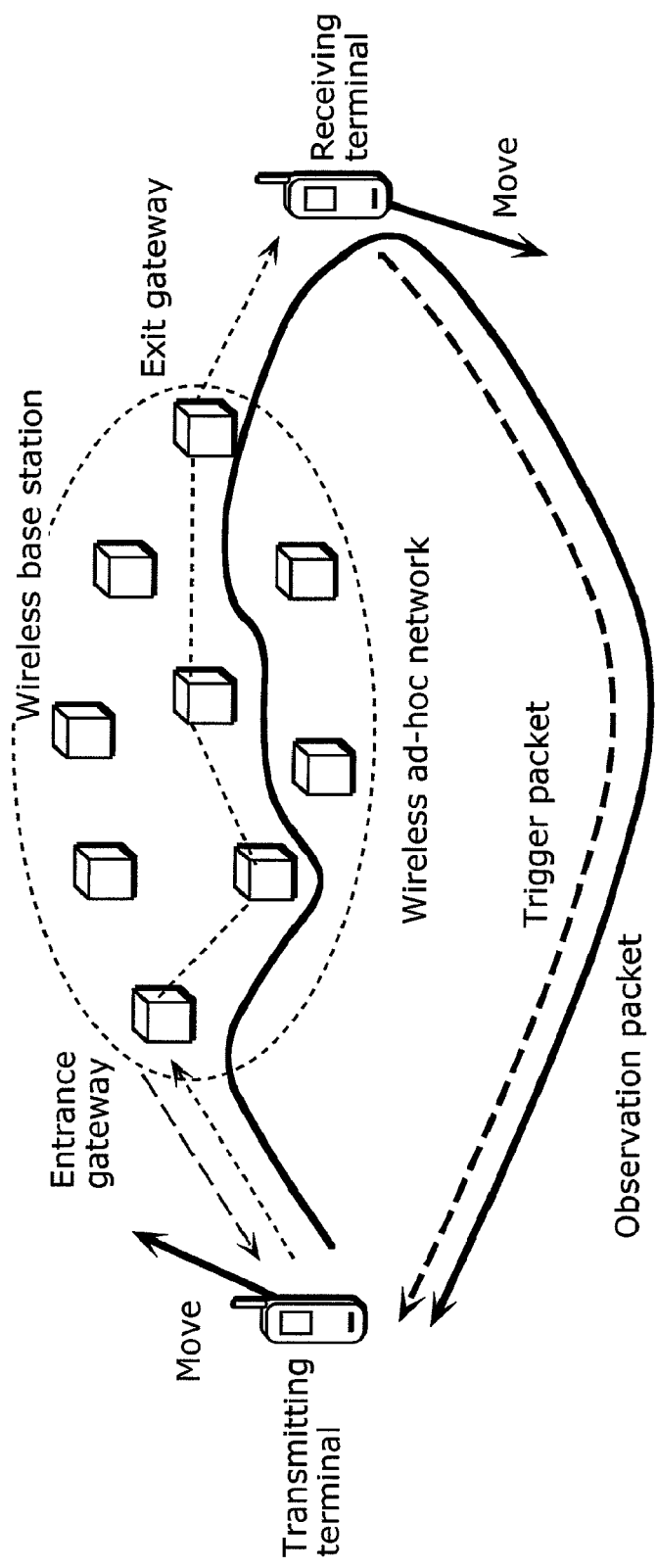
FIG. 3 illustrates an outline of a transmission technique distinguishing between congestion and a transmission error in the present invention.

FIG. 3 illustrates an outline of a transmission technique in the present invention, distinguishing between congestion and a transmission error.

Transmitted and received between the transmitting and receiving terminals (a transmitting terminal and a receiving terminal) is an observation packet for measuring: degraded state information (a packet loss rate and a delay time between the transmitting and receiving terminals) of transmission quality; and congested state information (a packet loss rate and a delay time at each of relay devices) of the relay device. Each of the relay devices, measuring the congestion condition information, writes the congested state information into the received observation packet. The receiving terminal measures a degraded state (the packet loss rate and a transmission delay time between the transmitting and the receiving terminals) of the transmission quality between the transmitting and the receiving terminals, writes the measured degraded state information into the received observation packet, and returns the observation packet to the transmitting terminal. Based on the observation packet, the transmitting terminal distinguishes between the transmission error rate and the congestion condition, and uses each of the distinguished transmission error rate and the congestion condition to control the forward error correction code technique or the intensity, and to control the transmission rate, respectively.

In addition, based on a change of a reception state of the transmitting and receiving terminal and the relay device, and a change of a routing renewal condition of the relay device, the receiving terminal or the relay device transmits a trigger packet towards the transmitting terminal. This allows the transmitting terminal to comprehend the change of a reception state in the receiving terminal and routing renewal of the relay device which cannot be detected at the transmitting terminal. The transmitting terminal receives the trigger packet. In response to the reception, the transmitting terminal transmits the observation packet. This eliminates the need for transmitting an unnecessary observation packet, and makes possible measuring the degraded state information of the transmission quality on the transmission path and the congested state information of the relay device. It is noted that the detection of the reception state change may be achieved by detecting:

reception field intensity, notification information of handover, a transmission speed, a selected forward error correction technique or selected intensity, a transmission error rate, or a change of information on the number of retransmission.

(Change of Reception State)

A change of reception state is observed at each of the transmitting terminal, the receiving terminal, and the relay device. When the transmitting and receiving terminal detects handover (a switch between relay devices for relaying), a connection condition has been changed (a destination relay device to which the terminal has been connected is switched to another destination relay device) between the transmitting terminal and receiving terminal. The change of the reception state at the receiving terminal, as described above, requires transmission and reception of the observation packet between the transmitting and receiving terminals. Typical handover processing (a switching process between transmission paths, following the switch of the destination relay devices) is triggered when reception field intensity of the relay device or the terminal decreases, or the transmission error rate increases based on a predetermined threshold. Even though no connection condition change is observed, an available bandwidth has been changed when the transmitting and receiving terminal detects a decrease in transmission speed to the predetermined threshold due to a significant change of a transmission environment, such as an appearance of an obstacle. Thus, the above case requires transmission of the observation packet, as well. In general, degradation of transmission quality causes a change in transmission speed. Hence, the change of information in the forward error correction technique or the intensity, the transmission error rate, or the number of retransmission may be detected, as well as the transmission speed. It is noted that the change of the reception state may be detected by using either each pieces of the above information alone or a combination of the pieces of the information.

Figure 4:
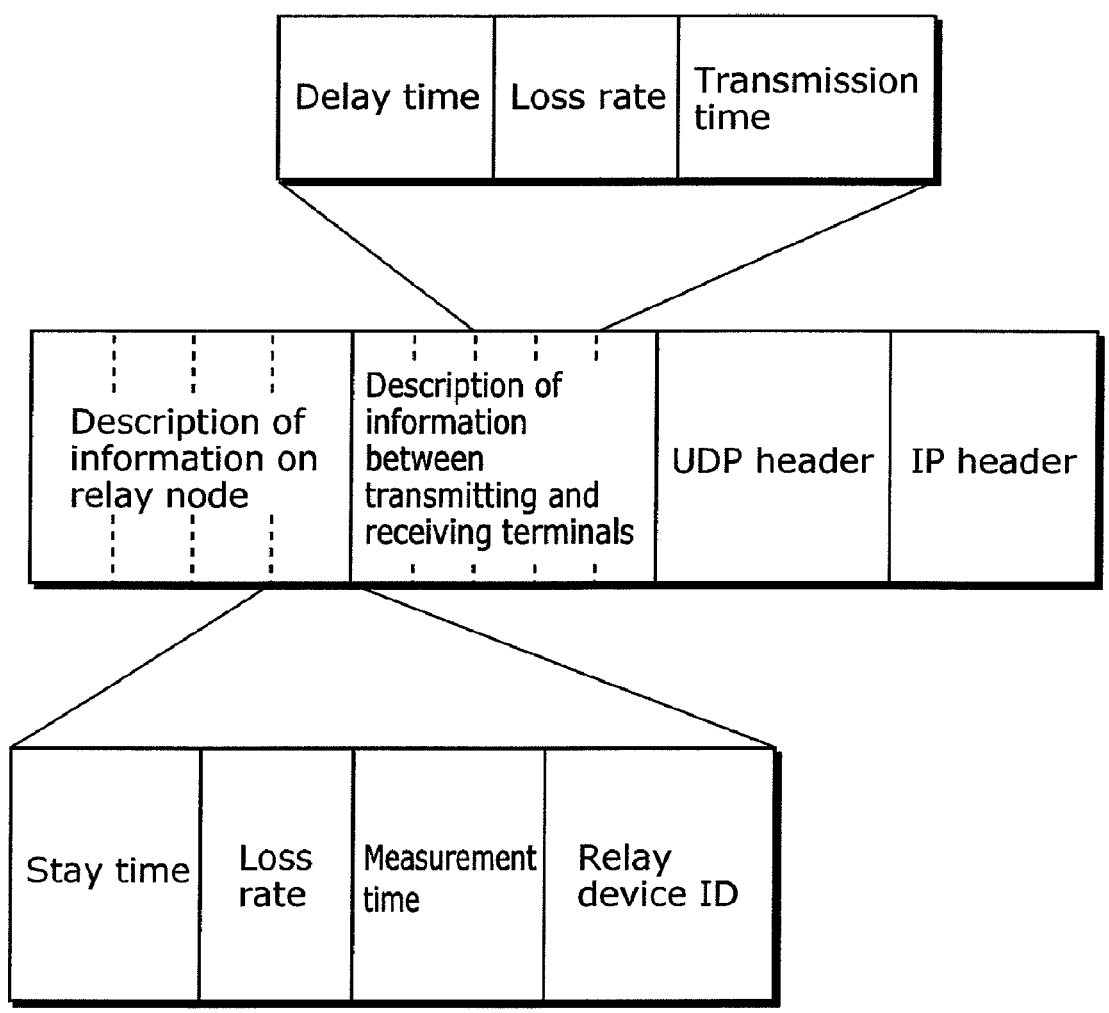
FIG. 4 illustrates a packet structure of an observation packet.

FIG. 4 illustrates a packet structure of the observation packet.

As specifications of the observation packet, in the present invention, maximizing the performance thereof, the observation packet includes description of information between the transmitting and receiving terminals and description of information on a relay node, as well as the IP header and the UDP (User Datagram Protocol) header. Described in the description of information between the transmitting and receiving terminals are a "transmission time" at which the transmitting terminal transmits the observation packet, a "loss rate" indicating a packet loss per unit time when data is transmitted from the transmitting terminal to the receiving terminal, and a "delay time" required for the data transmission from the transmitting terminal to the receiving terminal. It is noted that a serial number for determining a transmission order and missing data, and the transmission time used for measuring the delay time of each packets can be described, in the data to be transmitted, per packet for data transmission. An average value of delay times of associated packets is described in the "delay time" in the description of information between the transmitting and receiving terminals.

Further, described in the description of information on the relay node are a "relay device ID" identifying a device at which the data is relayed, a "measurement time" of a congested state in the relay device, a "loss rate" (a packet loss per unit time at the relay device) indicating the congested state in the relay device, and a "stay time" (an average time between reception and transmission of data at the relay device).

It is noted in Patent Reference 1 that each of the relay devices writes an additionally observed congested state to the above description of information on the relay node for every relay device the data passes through. In order to curb the overhead, including the packet analysis and the communication volume at the relay device, which Patent Reference 1 faces as a problem, the present invention may use the description of information between the transmitting and receiving terminals alone, instead of the description of information on the relay node, in order to obtain the total sum of congested states of all the relay devices.

Specifically, in transmitting the observation packet from the transmitting terminal, the transmission time in the information description between the transmitting and receiving terminals is set to a transmission time of the transmitting terminal, and the loss rate and the delay time are set to zero. Each relay device reads items of the loss rate and the delay time in the information description between transmitting and receiving terminals, adds a packet discarding rate at a buffer of the relay device and an average stay time of the packet in the buffer of the relay device to a value of the item of the loss rate and a value of the item of the delay time, respectively, and overwrites to transmit the added values to the associated items indicating the loss rate and the delay time in the information description between the transmitting and receiving terminals. It is noted that the observation packet is preferably processed separately from a data transmission packet in the relay device in order to keep data loss due to congestion from occurring.

The receiving terminal reads the observation packet which has been relayed via the relay devices to obtain, out of items indicating the loss rate and the delay time in the information description between the transmitting and receiving terminals, a total sum of the packet loss rates (L1) and a total sum of the delay times (T1) developed out of congestion at all the relay devices. Out of a difference between the reception time of the observation packet and the transmission time of the information description between the transmitting and receiving terminals, the receiving terminal calculates a total delay time (T2), between the transmitting and receiving terminals, regarding the delay time developed out of the congestion and the transmission error between the transmitting and receiving terminals. Out of a difference between T2 and T1, the receiving terminal calculates a total delay time (T3) mainly developed by the transmission error, rather than by the congestion.

Further, each of data transmission packets, transmitted separately from the observation packet, intends to have a sequential serial number assigned. Some of the data packets transmitted from the transmitting terminal are discarded when congestion or a transmission error occurs in relaying by the relay device. The receiving terminal measures a missing ratio of the serial number assigned to the data packet to calculate a total loss rate (L2) regarding the packet discarding occurred by the congestion and the transmission error between the transmitting and receiving terminals. Calculating the difference between the L2 and L1 makes possible obtaining a total loss rate (L3) developed by the transmission error.

The receiving terminal transmits the received observation packet to the transmitting terminal, as well as calculates L3 and T3 out of L1 and T1, respectively. Based on a value of L1 or T1 of the observation packet which the transmitting terminal receives from the receiving terminal, the transmitting terminal adjusts a transmission amount therefrom. Specifically, the transmitting terminal determines the development of the congestion and reduces the transmission amount when the value of L1 or T1 is greater than a predetermined threshold value (Th1), and determines the reduction of the congestion and increases the transmission amount when the value of L1 or T1 is smaller than a predetermined threshold (Th2). It is noted that Th1 and Th2 may be empirically determined.

Further, the value of L3 or T3; that is the transmission quality information on the transmission error calculated by the receiving terminal, is either additionally written in the observation packet, or transmitted to the transmitting terminal as a separate packet. However, the information on the transmission error does not necessarily require transmission to the transmitting terminal. In transmitting, the information on the transmission error does not need to be transmitted at the same timing as the observation packet is transmitted.

Figure 5:
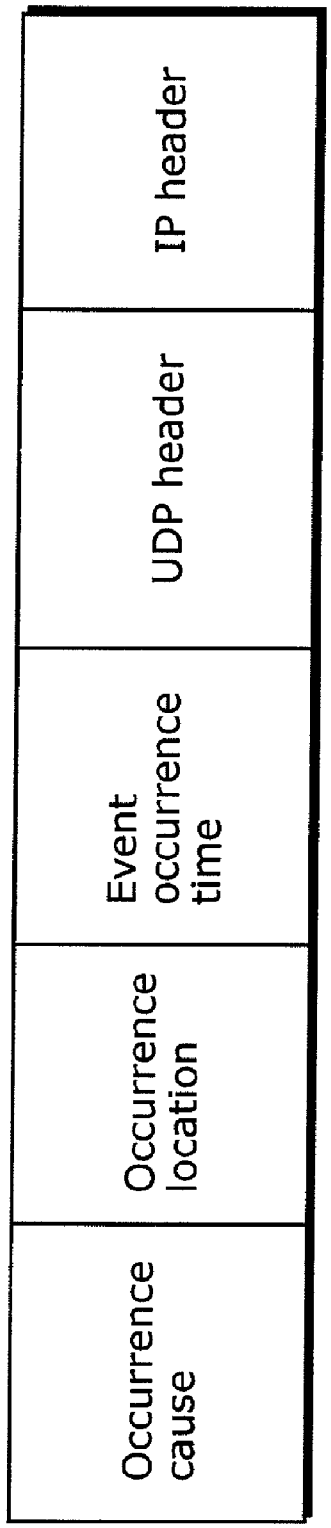
FIG. 5 illustrates a packet structure of a trigger packet.

Based on the values, the transmitting terminal determines that the number of transmission errors is increasing in the case where the value of L3 or T3 is greater than the predetermined threshold (Th3) and enhances a transmission error correction capability. Meanwhile, the transmitting terminal determines that the number of transmission errors is decreasing in the case where the value of L3 or T3 is smaller than the predetermined threshold (Th4) and decreases the transmission error correction capability. When the transmission error correction capability is intended to be set in the application layer, as shown in FIG. 5, a forward error correction technique and a redundancy degree for data to be transmitted are selected. When the transmission error correction capability is intended to be set in the data link layer, the forward error correction technique and the redundancy degree for a targeted wireless transmission path are selected. It is noted that Th3 and Th4 may be empirically determined.

FIG. 5 illustrates a packet structure of the trigger packet.

The trigger packet includes an "event occurrence time", an "occurrence location", and an "occurrence cause" in addition to the UDP header and the IP header. The "event occurrence time" represents times indicating: a change of a reception state at the transmitting terminal and the relay device; and a switch of routing paths at the relay device. The "occurrence location" is information (an IP address, for example) specifying locations (transmitting terminal or relay device) at which such a change and a switch occur. Described in the "occurrence cause" are a reception field intensity, a transmission speed, handover, and routing as specific details of the change of the reception state at the transmitting terminal and the relay device.

Figure 6:
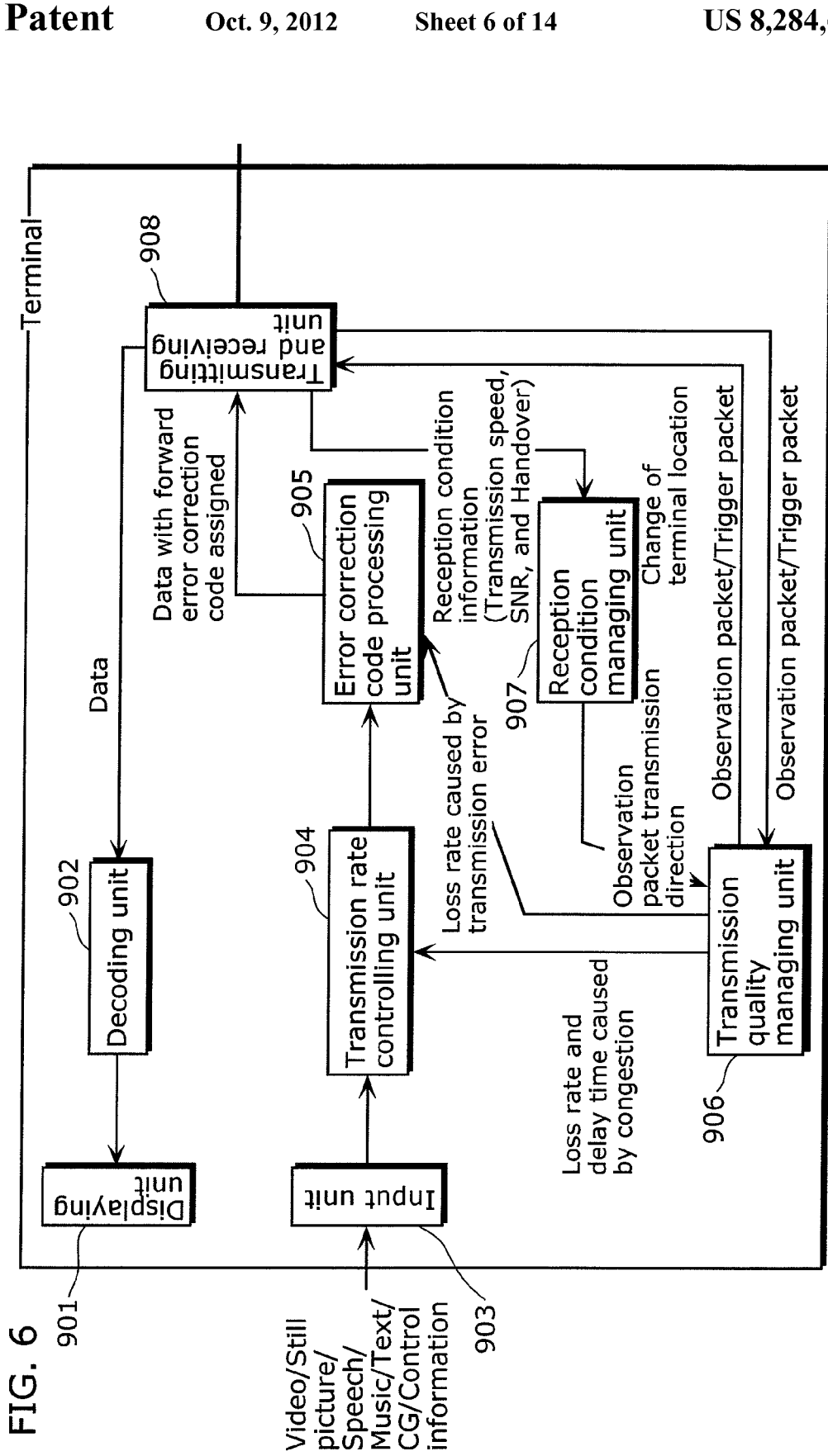
FIG. 6 illustrates a structure of a terminal.

FIG. 6 illustrates a structure of the terminal.

The terminal; that is a transmitting terminal transmitting data and a receiving terminal receiving data, includes a displaying unit 901, a decoding unit 902, an input unit 903, a transmission rate control unit 904, an error correction code processing unit 905, a transmission quality managing unit 906, a reception state managing unit 907, and a transmitting and receiving unit 908.

The displaying unit 901 displays decoded data.

The decoding unit 902 decodes data which requires decoding, such as videos and speeches.

The input unit 903 is capable of inputting different kinds of media data including videos, still pictures, speeches, music, text, computer graphics (CG), and control information.

The transmission rate control unit 904 determines the transmission rate out of the loss rate and the delay time caused by the congestion.

The transmission quality managing unit 906 distinguishes between a loss caused by the congestion and a loss caused by the transmission error and extracts the losses according to the observation packet.

The reception state managing unit 907 detects the change of the reception state of the transmitting and receiving terminal.

The error correction code processing unit 905 determines presence or absence, a scheme, and an intensity of the forward error correction code in the application layer according to the transmission error rate.

The transmitting and receiving unit 908 transmits and receives data with the forward error correction code assigned.

To be more specific, the terminal includes: the transmitting and receiving unit 908 transmitting and receiving the observation packet for observing the transmission quality and data; the transmission quality managing unit 906 (i) exchanging the observation packet with another terminal via the transmitting and receiving unit 908, (ii) observing a loss rate of the data between the terminal and the other terminal and writing to the observation packet the degraded state information indicating the loss rate in the case where the terminal receives the data, and (iii) subtracting the congested state information from the degraded state information included in the observation packet collected from the other terminal in order to calculate a transmission error rate of the data in the terminal and the relay device in the case where the terminal transmits the data; the reception state managing unit 907 detecting the change of the reception state of the data at the transmitting and receiving unit 908 and, in the case where the reception state managing unit 907 determines that the reception state has changed, directing the transmission quality managing unit 906 to transmit the observation packet; and the error correction code processing unit 905 determining a forward error correction capability based on the transmission error rate calculated by the transmission quality managing unit 906 and assigning to the data to be transmitted the forward error correction code according to the forward error correction capability.

It is noted in the transmitting terminal that when the reception state managing unit 907 detects the change of the reception state at reception state managing unit 907, and when the transmission quality managing unit 906 receives the trigger packet, the transmission quality managing unit 906 in the transmitting terminal transmits the observation packet to the receiving terminal. Further, the transmitting and receiving unit 908 transmits the data, the reception state information, and the observation packet and the trigger packet to the decoding unit 902, the reception state managing unit 907, and the transmission quality managing unit 906, respectively.

It is noted that the detection of the change of the reception state may be achieved by detecting the reception field intensity, the notification information of handover, the transmission speed, the selected forward error correction technique or the selected intensity, the transmission error rate, or the change of information on the number of retransmission.

Specifically, the reception state managing unit 907 detects the change of the reception state at the transmitting and receiving unit 908. For example, the reception state managing unit 907 determines that the reception state has changed in the case where (i) the reception field intensity goes below a predetermined threshold for a certain period of time, (ii) the relay device detects the fact that the receiving terminal has moved to belong to another area, and then transmits to the receiving terminal the notification information of handover, (iii) the transmission speed or a transmission mode changes and the forward error correction technique or the intensity is changed since the transmission error rate goes higher than a predetermined threshold for a certain period of time, and (iv) the number of retransmission goes higher than a predetermined threshold due to a packet loss caused by the congestion and the transmission error. On the contrary, when transmission condition improves with respect to a threshold, the reception state managing unit 907 determines that the reception state has changed. In the case where the terminal is a transmitting terminal, the reception state managing unit 907 prompts the transmission quality managing unit 906 to transmit the observation packet to the receiving terminal only when the reception state has changed. In addition, when the terminal is a receiving terminal, the reception state managing unit 907 prompts the transmission quality managing unit 906 to transmit the trigger packet to the transmitting terminal. It is noted that the reception state managing unit 907 may determine that the reception state has changed when detecting that the congested state information included in the observation packet or the loss rate indicated in the degraded state information has gone higher or lower with respect to a predetermined threshold.

Figure 7:
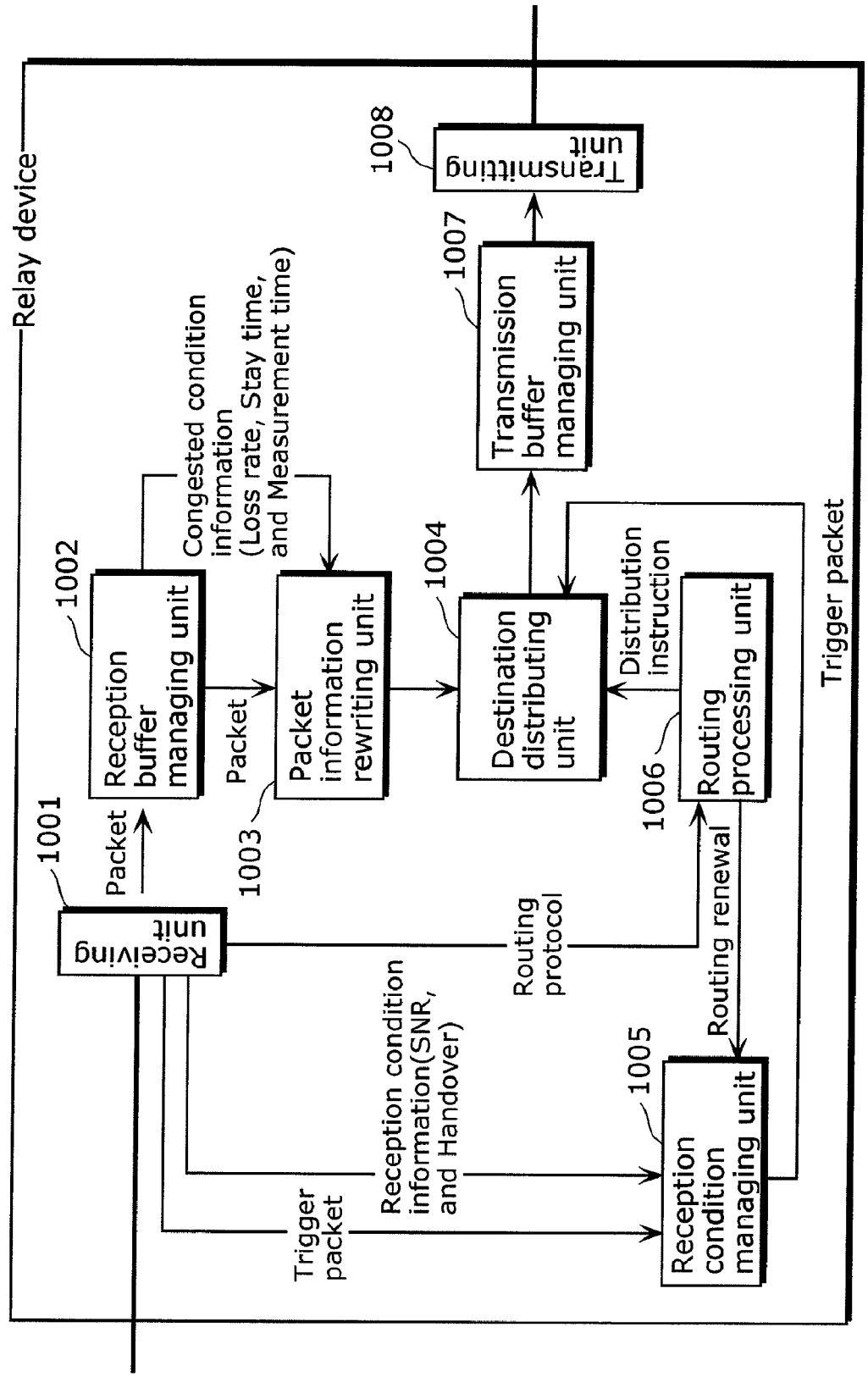
FIG. 7 illustrates a structure of a relay device.

FIG. 7 illustrates a structure of the relay device.

The relay device, connected to the terminal via a network and relaying the data to be transmitted and received between the terminals, includes a receiving unit 1001, a reception buffer managing unit 1002, a packet information rewriting unit 1003, a destination distributing unit 1004, a reception state managing unit 1005, a routing processing unit 1006, a transmission buffer managing unit 1007, and a transmitting unit 1008.

The receiving unit 1001 receives the data transmitted from another relay device and the terminal.

The reception buffer managing unit 1002 temporality accumulates the received data and, when a reception buffer is about to overflow, discards a packet according to a predetermined rule (for example, discarding transmission packets at random when the reception buffer is occupied up to ⅔ of the capacity (threshold)).

The packet information rewriting unit 1003 collects the congested state information (loss rate, stay time, and measurement time) of the reception buffer and, when the observation packet is found in the reception buffer, writes the congested state information into the observation packet. It is noted that the packet information rewriting unit 1003 does not perform processing on any other packet than the observation packet.

The destination distributing unit 1004 determines the next relay device as a transmission destination of a packet stored in the reception buffer managing unit 1002 according to a packet destination table (routing table) generated by the routing processing unit 1006.

The reception state managing unit 1005 detects a change of a reception state (including reception field intensity and handover) at the receiving unit 1001 in the relay device.

The routing processing unit 1006 extracts to analyze a routing protocol from the receiving unit 1001, and generates the packet destination table.

The transmission buffer managing unit 1007 prepares a transmission queue for each of destinations, and transmits a predetermined transmission amount of packets at a predetermined timing.

The transmitting unit 1008 transmits the data.

To be more specific, the relay device, connected to the terminal via a network and relaying the data to be transmitted and received between the terminals, includes: the receiving unit 1001 receiving the data and the observation packet for observing the transmission quality; the reception buffer managing unit 1002 (i) having a reception buffer for storing data, (ii) storing the received data in the reception buffer, (iii) discarding data failed to be stored in the reception buffer, and (iv) observing a data loss rate in the reception buffer; the packet information rewriting unit 1003 writing the loss rate observed at the reception buffer managing unit 1002 to the observation packet as congested state information; the transmission buffer managing unit 1007 having a transmission buffer for storing the data stored in the reception buffer on a destination basis, and transmitting the data stored in the transmission buffer at a predetermined transmission rate on a destination basis; the transmitting unit 1008 transmitting the data, forwarded by the transmission buffer managing unit 1007, towards the destination; the reception state managing unit 1005 detecting the change of the reception state of the data at the transmitting unit 1008, and, in the case of determining the change of the reception state, directing transmission of the observation packet to the transmission quality managing unit 906 included in the source terminal of the data; the routing processing unit 1006 using a predetermined routing protocol to generate a routing table indicating a transmission path of the data;

and the destination distributing unit 1004 determining the next destination of the data according to the routing table.

Similar to the terminal, the reception state managing unit 1005 detects the change of the reception state at the relay device. Specifically, the reception state managing unit 1005 detects the reception field intensity, the notification information of handover, the transmission speed, the selected forward error correction technique or the selected intensity, the transmission error rate, or the change of information on the number of retransmission, as well as renewal of the routing table. Detecting the change of the reception state, the reception state managing unit 1005 prompts the destination distributing unit 1004 to transmit the trigger packet. It is noted that the reception state managing unit 1005 may determine the change of the reception state when detecting that the loss rate indicated in the congested state information included in the observation packet goes higher or lower with respect to a predetermined threshold.

For example, the reception state managing unit 1005 determines that the reception state has changed in the case where (i) the reception field intensity goes below a predetermined threshold for a certain period of time, (ii) the relay device detects the fact that the receiving terminal has moved to belong to another area, (iii) the transmission speed or a transmission mode decreases and the forward error correction technique or the intensity is changed since the transmission error rate goes higher than a predetermined threshold for a certain period of time, (iv) the number of retransmission goes higher than a predetermined threshold due to a packet loss caused by the congestion and the transmission error, and (v) the routing is reestablished. On the contrary, when transmission condition improves with respect to a threshold, the reception state managing unit 1005 determines that the reception state has changed.

(Aggregation of Trigger packets at the Relay Device)

In addition, the reception state managing unit 1005 receives trigger packets from the receiving unit 1001. The reception state managing unit 1005: compares a received trigger packet with a previously received trigger packet having the same source and destination as the trigger packet has; and determines whether or not a time difference between a current time (reception time at the reception state managing unit 1005) of the currently received trigger packet and a transmission time (to the destination distributing unit 1004) of the previously received trigger packet is within a predetermined time. Based on the determination result, the reception state managing unit 1005 determines whether the trigger packet transmitted from the receiving unit 1001 is to be transmitted or discarded, and executes the resulting determination in order to make possible reducing the number of the trigger packets, which leads to reduction of a traffic amount of the packets and the processing amount of the packets at the transmitting and receiving terminal and the relay device.

Specifically, when receiving the trigger packet from the receiving terminal and another relay device, the receiving unit 1001 transmits the received trigger packet to the reception state managing unit 1005. The reception state managing unit 1005 compares data included in the received trigger packet with data included in the previously received trigger packet in order to confirm whether or not the trigger packet including the same source and destination has already been transmitted outside within the predetermined time. In the case where the trigger packet has been transmitted towards the same source and the same destination, the reception state managing unit 1005 discards a newly received trigger packet, instead of transmitting the newly received trigger packet to the destination distributing unit 1004. On the contrary, in the case where a time goes after the predetermined time, and the destination of the trigger packet is different even transmitted within the predetermined time, the reception state managing unit 1005 transmits the newly received trigger packet to the destination distributing unit 1004.

Figure 8:
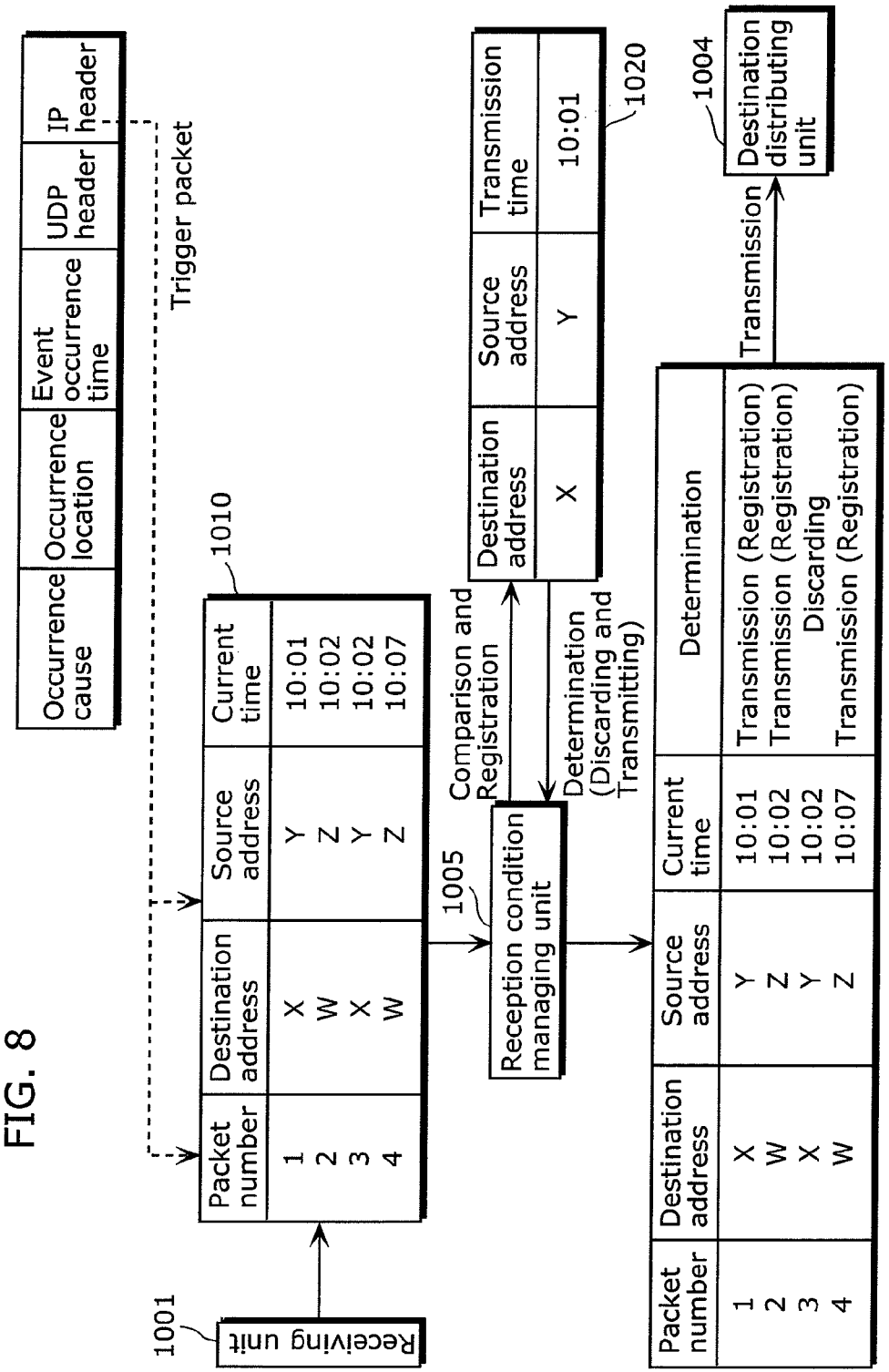
FIG. 8 illustrates an operation of a reception state managing unit.

FIG. 8 illustrates an operation of the reception state managing unit 1005.

FIG. 8 shows a trigger packet image 1010 received by the receiving unit 1001. The reception state managing unit 1005 obtains the source address and the destination address from the IP header of the trigger packet to measure a current time indicating when the reception state managing unit 1005 receives the trigger packet. The reception state managing unit 1005 has not previously received a trigger packet having the same destination and source as a trigger packet with the packet number 1 has. Thus, the reception state managing unit 1005 transmits the trigger packet to the destination distributing unit 1004. In addition, the reception state managing unit 1005 has not relayed the trigger packet to the destination address "X" shown in the trigger packet with the packet number 1. Thus, the reception state managing unit 1005 records details of the trigger packet with the packet number 1 in a managing table 1020 in the reception state.

Not having previously performed transmission to the same destination as a trigger packet with the packet number 2 has been transmitted, similar to the trigger packet with the packet number 1, the reception state managing unit 1005 transmits the trigger packet with the packet number 2 and additionally writes details of the trigger packet with the packet number 2 on the managing table 1020 in the reception state.

A trigger packet with the packet number 3 has the same destination and source addresses as the trigger packet with the packet number 1 has. Further, provided that the predetermined time is assumed to be three minutes, a time interval between the time (10:01) receiving the trigger packet with the packet number 1 and the time (10:02) receiving the trigger packet with the packet number 3 is less than three minutes. Hence, the trigger packet with the packet number 3 is not transmitted and discarded.

A trigger packet with the packet number 4 has the same destination and source addresses as the trigger packet with the packet number 2 has. However, a time interval between the time (10:02) receiving the trigger packet with the packet number 2 and the time (10:07) receiving the trigger packet with the packet number 4 is three minutes or longer. Thus, the trigger packet with the packet number 4 is transmitted, and the transmission time of the managing table 1020 in the reception state is renewed. It is noted that when the routing processing unit 1006 informs the reception state managing unit 1005 of the renewal of the routing table, the reception state managing unit 1005 transmits the trigger packet to the destination address described in the managing table 1020 in the reception state.

Described above is the operation of the reception state managing unit 1005 in the relay device; meanwhile, the reception state managing unit 907 in the terminal carries out a similar operation.

Figure 9:
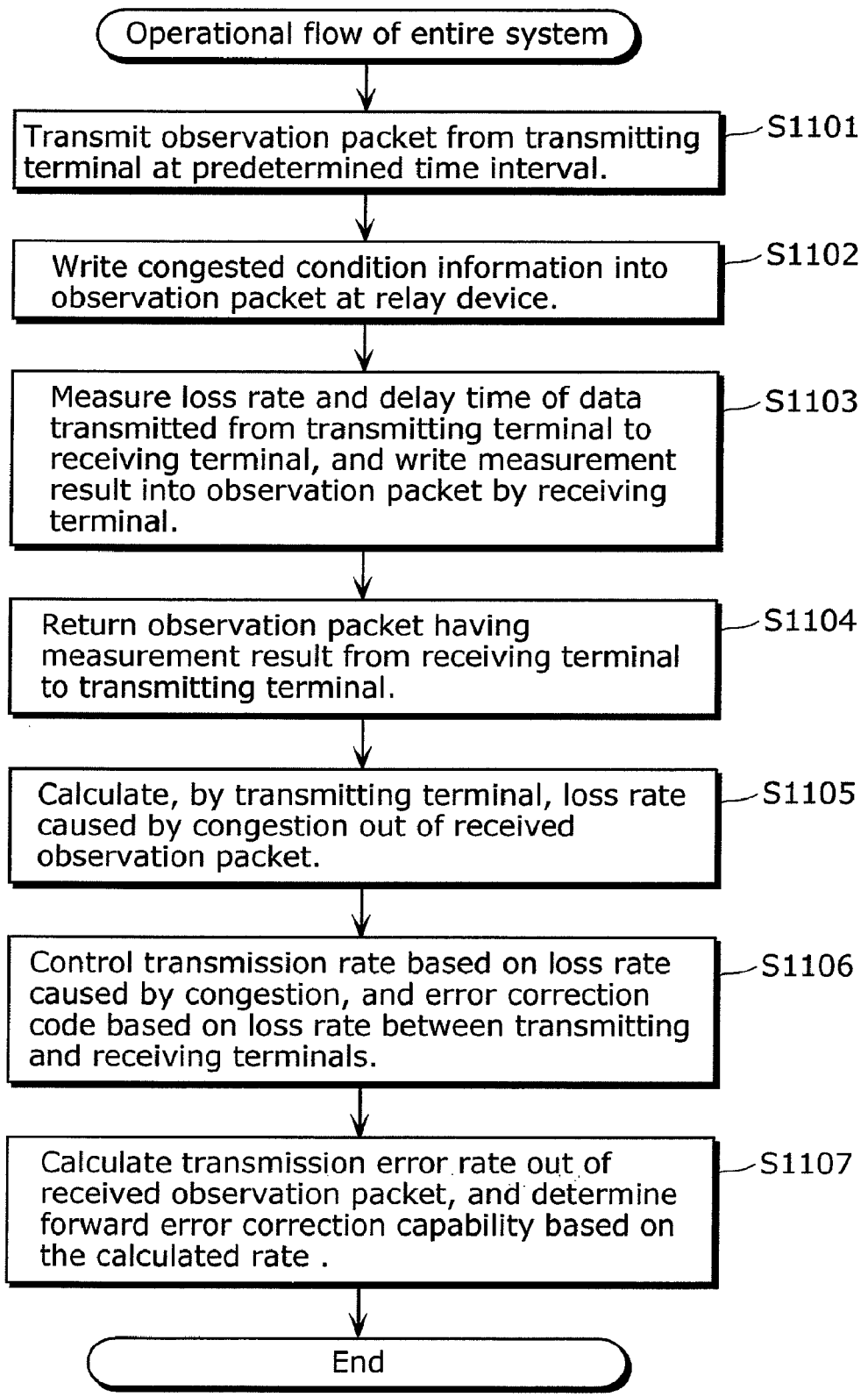
FIG. 9 is a flowchart showing an operation of an entire system.

FIG. 9 is a flowchart showing an operation of an entire system.

The transmission quality managing unit 906 in the transmitting terminal transmits the observation packet at a predetermined time interval (S1101). The relay device writes into the observation packet the congested state information (loss rate, stay time, and measurement time) measured at the reception buffer managing unit 1002. The receiving terminal measures the loss rate and the delay time of the data transmitted from the transmitting terminal to the receiving terminal, and writes into the observation packet the measurement result (S1103).

The receiving terminal returns the observation packet having the measurement result to the transmitting terminal (S1104). The transmitting terminal causes the transmission quality managing unit 906 to calculate the loss rate caused by congestion out of the received observation packet (S1105). The transmitting terminal controls: the transmission rate based on the loss rate caused by the congestion; and the error correction code based on a loss rate between the transmitting and receiving terminals (S1106). Similarly, the transmission quality managing unit 906 in the transmitting terminal calculates the transmission error rate out of the received observation packet, and determines the forward error correction capability of the error correction code processing unit 905 based on the calculated transmission error rate (S1107). It is noted that the transmission error rate is calculated by subtracting the loss rate caused by the congestion from the loss rate between the transmitting and receiving terminals.

Figure 10:
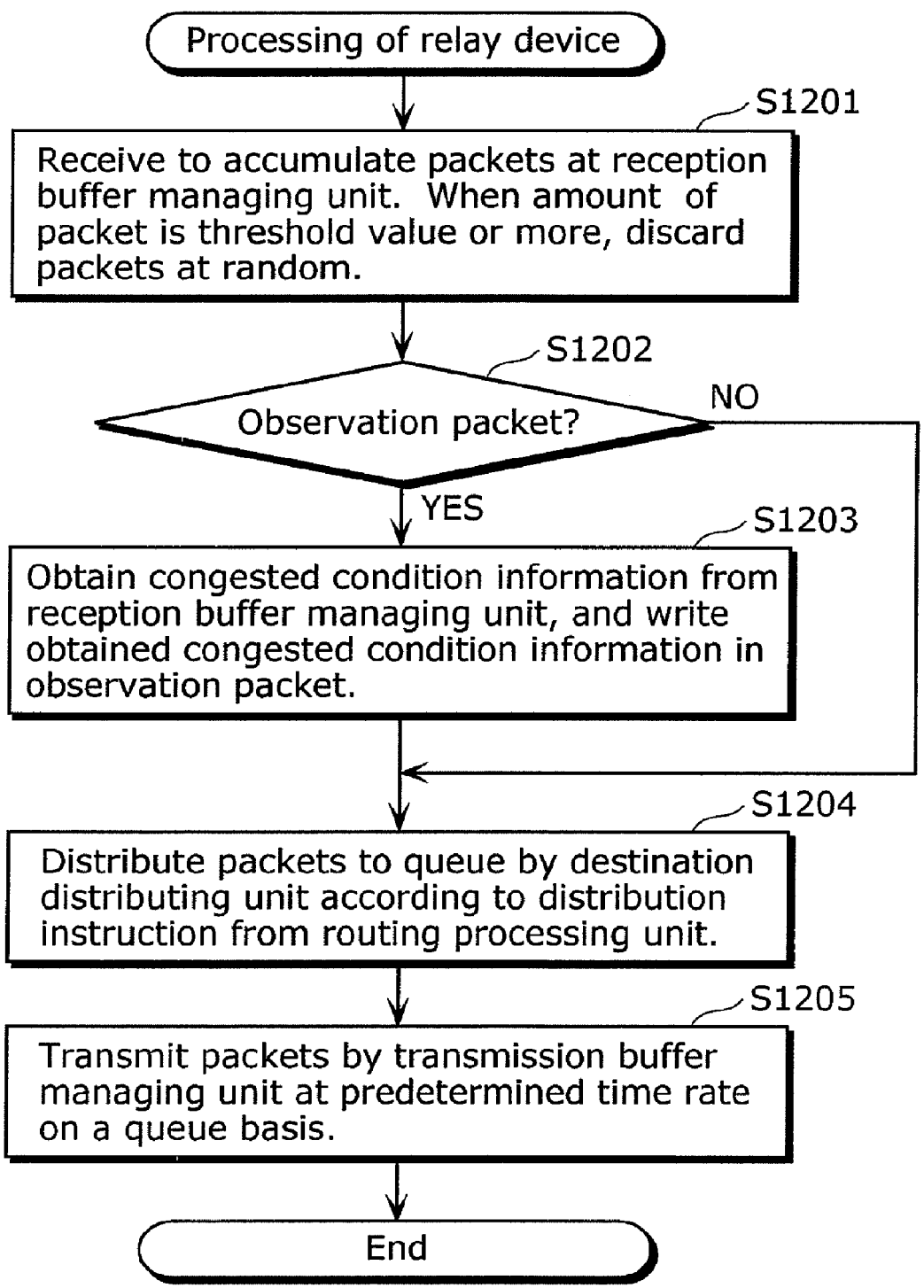
FIG. 10 is a flowchart showing an operation of the relay device.

FIG. 10 is a flowchart showing an operation of the relay device.

The reception buffer managing unit 1002 receives to accumulate packets. When an amount of the packet is a threshold value or more, the reception buffer managing unit 1002 discards the packets at random (S1201). The packet information rewriting unit 1003 determines whether or not the received packets are observation packets (S1202). In the case where each of the received packets is an observation packet (S1202:

YES), the packet information rewriting unit 1003 obtains the congested state information from the reception buffer managing unit 1002, and writes the obtained congested state information into the observation packet (S1203).

According to a distribution instruction from the routing processing unit 1006, the destination distributing unit 1004 distributes the packets to an appropriate queue included in the transmission buffer managing unit 1007 (S1204). The transmission buffer managing unit 1007 transmits the packet at a predetermined time interval on a queue basis (S1205).

Figure 11:
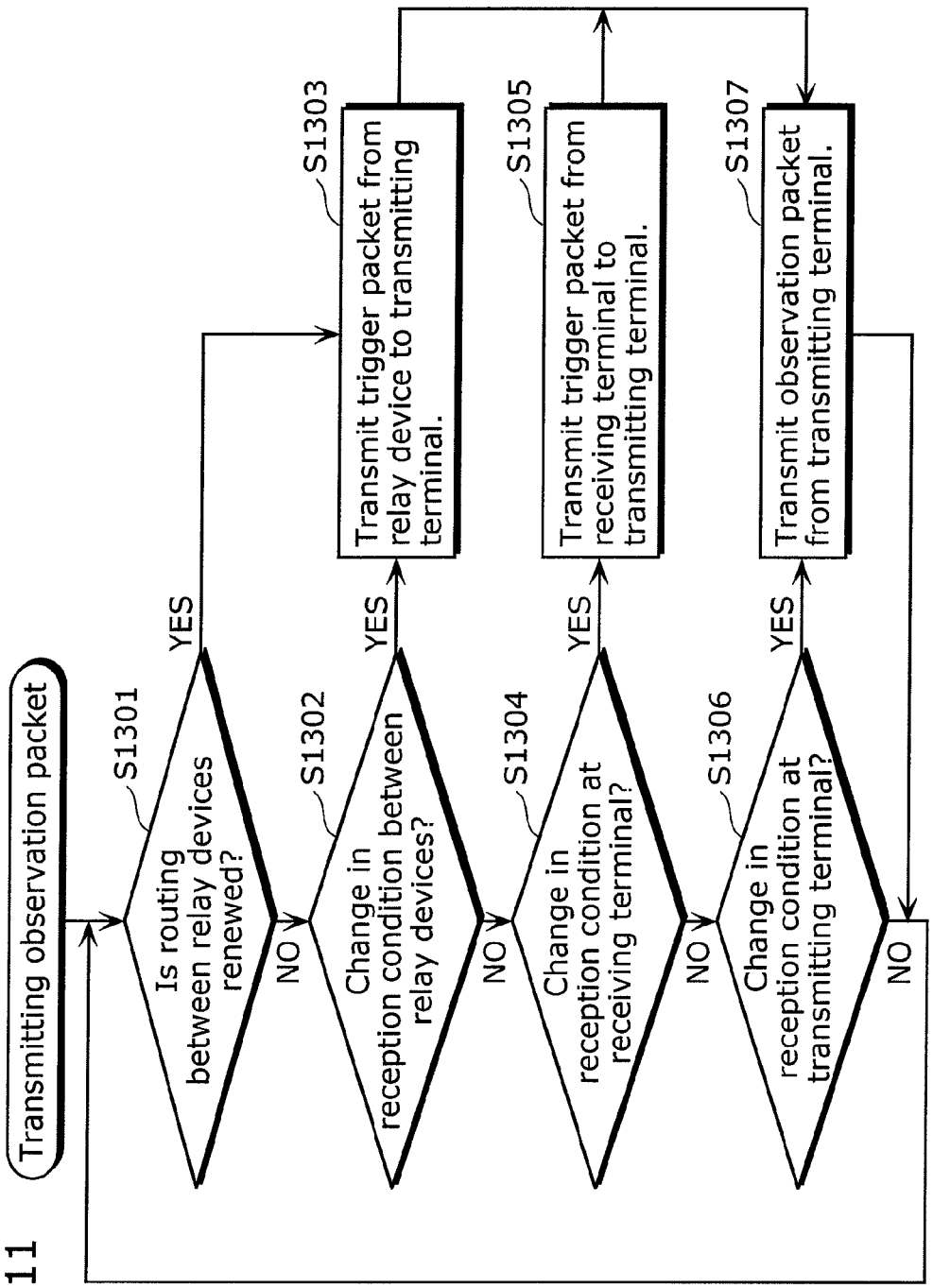
FIG. 11 is a flowchart showing transmission processing of the observation packet.

FIG. 11 is a flowchart showing transmission processing of the observation packet.

The relay device determines whether or not routing between the relay devices has been renewed (S1301). When the routing has been renewed (S1301: YES), the relay device determines that a change in a logic structure of the network leads to a change in the degraded state of the transmission quality, and transmits the trigger packet to the transmitting terminal (S1303). This prompts the relay device to transmit the observation packet to the transmitting terminal.

Further, the relay device determines whether or not the reception state between the relay devices has changed (S1302). When determining that the reception state between the relay devices has changed (S1302: YES), the relay device determines that a change in the connection condition between the relay device and the transmitting terminal or the receiving terminal leads to a change in the degraded state of the transmission quality, and transmits the trigger packet to the transmitting terminal (S1303). This prompts the relay device to transmit the observation packet to the transmitting terminal.

Further, the receiving terminal determines whether or not the reception state at the receiving terminal has changed (S1304). When the reception state at the receiving terminal has changed (S1304: YES), the receiving terminal determines that a change in the connection condition between the receiving terminal and the relay device leads to a change in the degraded state of the transmission quality, and transmits the trigger packet to the transmitting terminal (S1305). This prompts the receiving terminal to transmit the observation packet to the transmitting terminal.

In addition, the transmitting terminal determines whether or not the reception state at the transmitting terminal has changed (S1306). When the reception state at the transmitting terminal has changed (S1306: YES), the transmitting terminal determines that a change in the connection condition between the transmitting terminal and the relay device leads to a change in the degraded state of the transmission quality, and transmits the observation packet towards the receiving terminal (S1307).

As described above, detected are the changes in the reception states of the transmitting and receiving terminal and the relay device, and the change in the routing of the relay device. Hence, the trigger packet can inform the transmitting terminal of the changes of the receiving terminal and the relay device, in addition to the change of transmitting terminal. Thus, the transmitting terminal is capable of transmitting observation packets at a necessary timing, instead of regularly transmitting unnecessary observation packets.

Figure 12A:
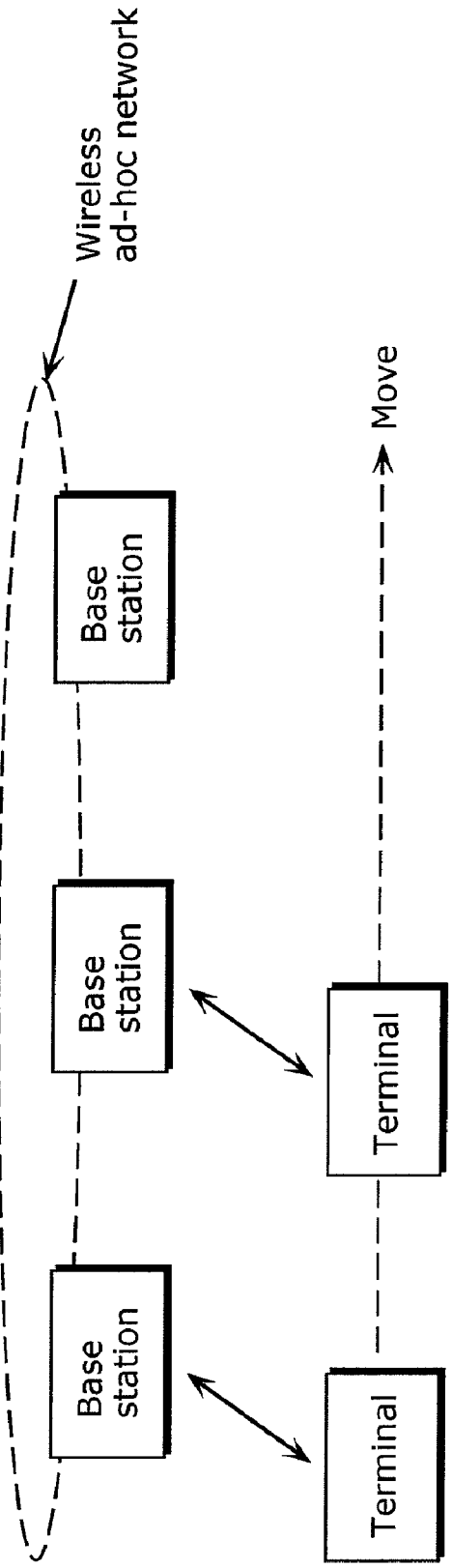
FIG. 12A illustrates a scene showing a specific usage of a wireless ad-hoc network.
Figure 12B:
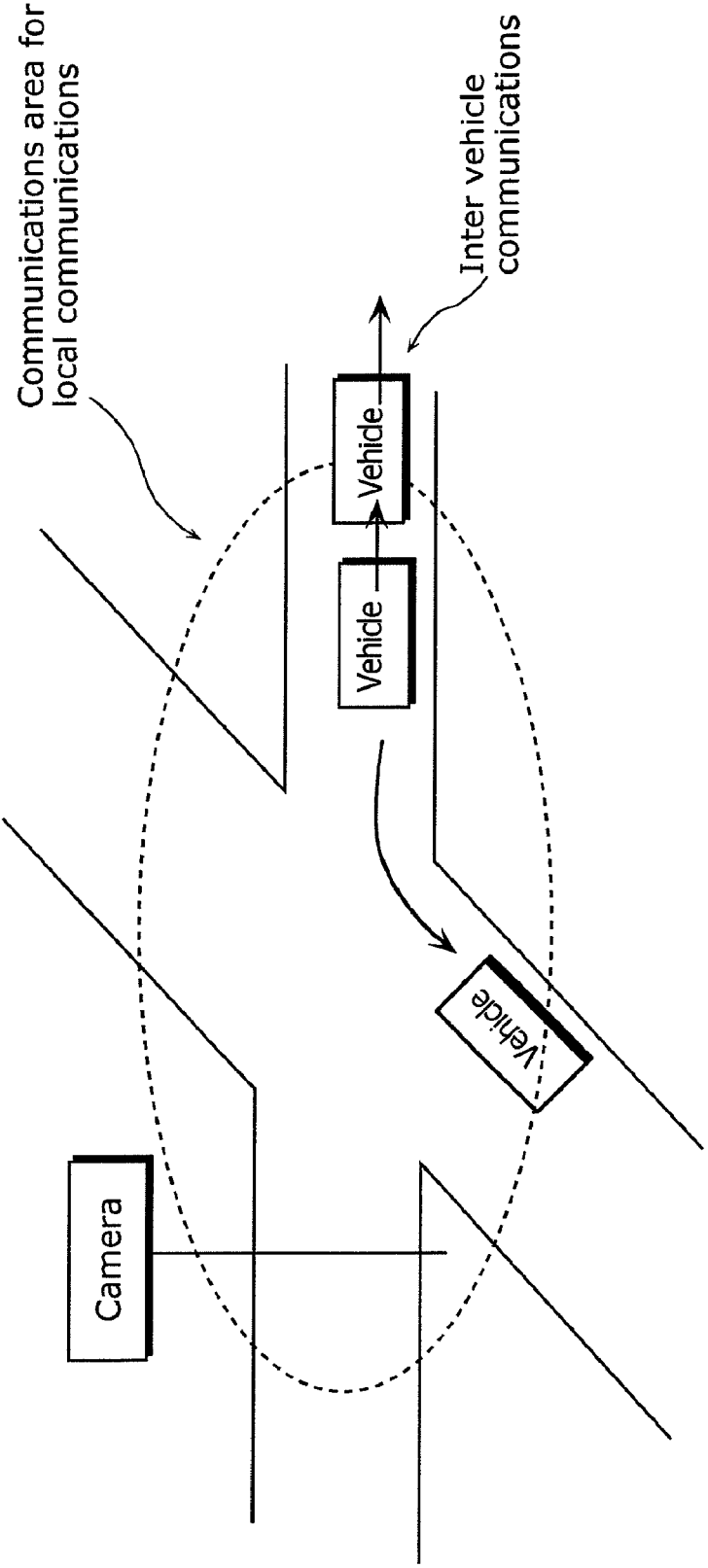
FIG. 12B illustrates a scene showing a specific usage of a wireless ad-hoc network.

FIGS. 12A and 12B illustrate a scene showing a specific usage of a wireless ad-hoc network.

A typical example of the wireless ad-hoc network may be a use of the wireless ad-hoc network for complementarily eliminating a dead zone of a radio wave in the case where the dead zone develops depending on locations of wireless base stations. As shown in FIG. 12A, for example, a smaller cell of a base station tends to develop the dead zone. Thus the wireless ad-hoc network can be effective in expanding a communication area while reducing installation costs of the base station. Here, the cell of the base station means a range within which a radio from the base station can travel; namely, a service area.

Similarly, as shown in FIG. 12B, another possible method is to use a car as the relay device to establish inter vehicle communications in order to expand a communication area for a local communications device at an intersection. An example of utilizing the inter vehicle communications is to distribute a video shoot in the vicinity of the intersection via the local communications device, such as the Dedicated Short Range Communication (DSRC) and a wireless LAN, in order to expand the communication area for the local communications device through the inter vehicle communications.

The use of the wireless ad-hoc network makes possible expanding the communication area even through a complex area, such as an intersection, and providing a video covering a blind area to the car. This assists safe driving.

Figure 13:
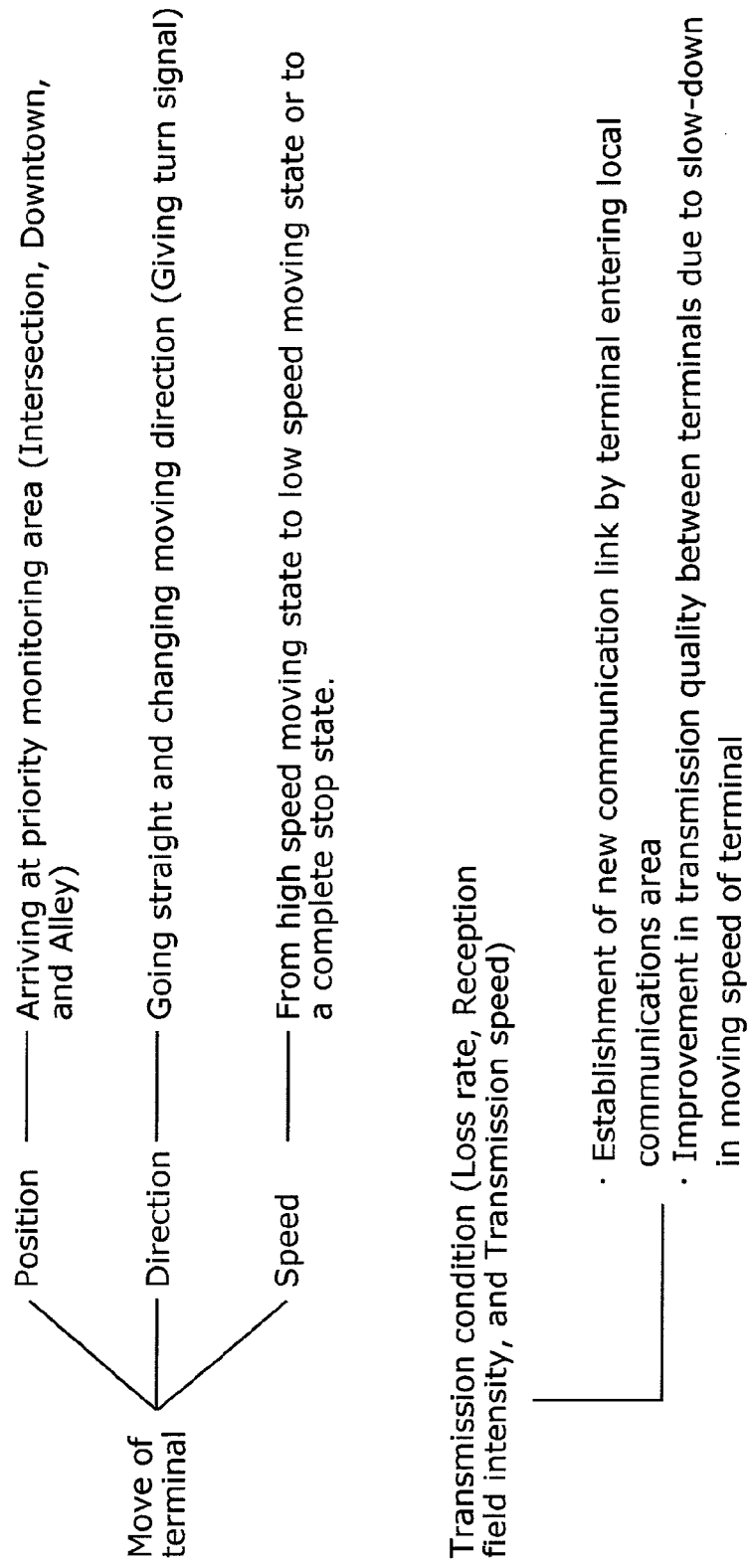
FIG. 13 illustrates a control technique of the observation packet and the trigger packet based on a usage scene.

FIG. 13 illustrates a control technique of the observation packet and the trigger packet based on a usage scene.

Focusing on a move of a terminal (moving car and portable terminal), an expected high demand is to watch a received video in high image quality when the moving terminal arrives at a priority monitoring area (intersection, downtown area, and alley). To meet the demand, an interval for transmitting the observation packet and the trigger packet can be shortened for greater resilience to congestion and a transmission error, so that the received video can be watched in high image quality. It is noted that installing a Global Positioning System (GPS) and a database of locations of priority monitoring areas in the terminal readily realizes detection of the terminal arriving at the priority monitoring area.

Another expected high demand to watch a received video in high image quality is the case where a moving terminal going straight ahead changes the moving direction. An exemplified case is that the moving terminal is a car, and the car is assumed to give a turn signal. To meet the demand, an interval for transmitting the observation packet and the trigger packet can be shortened for greater resilience against congestion and a transmission error, so that the received video can be watched in high image quality. It is noted that detection of a change of a moving direction of the moving terminal can be achieved by sequentially obtaining: a condition change of a turn signal when the moving terminal is a car; and GPS-based position information when the moving terminal is a portable terminal, and by detecting a temporal change of each of the condition change and the position information.

Further considered is a case where a user has more opportunities to watch a video in high quality when the moving terminal makes a transition from a high speed moving state to a low speed moving state or to a complete stop state. To meet the demand, an interval for transmitting the observation packet and the trigger packet can be shortened for greater resilience against congestion and a transmission error, so that the received video can be watched in high image quality. It is noted that the detection of the moving speed of the terminal can be achieved by sequentially calculating position information on the GPS and by detecting a temporal change of the position information.

Further, detection of a change of a transmission condition of the moving terminal expects a high demand to watch a received video in high image quality. Here, the change of the transmission condition specifically means at least one of the changes of the loss rate, the reception field intensity, and the transmission speed. To meet the demand, an interval for transmitting the observation packet and the trigger packet can be shortened for greater resilience against congestion and a transmission error.

By detecting the change of the transmission condition of the moving terminal, for example, the facts that the moving terminal has entered a local communications area, or the moving terminal has performed handover to another base station are detected. Accordingly, a short interval is set for transmitting the observation packet and the trigger packet for a certain period in establishing a new communication link. This allows a stable transmission condition to be quickly established.

When utilizing the inter vehicle communications, moreover, cars making a stop before the intersection slow down the moving speed of the terminal. This provides stable communications (inter vehicle communications) between terminals, and improves the transmission quality. In establishing a transmission path between terminals when the terminal slows down the moving speed, as described above, a short interval is set for transmitting the observation packet and the trigger packet for a certain period in establishing the transmission path. This allows a stable transmission condition to be quickly established. It is noted that the above may be applied to a portable terminal including a cellular phone, as well as a car.

As described above, the embodiment involves transmitting an observation packet from a transmitting terminal towards a receiving terminal via the relay device. Upon receiving the observation packet, the relay device writes into the observation packet congested state information indicating a data loss rate at the relay device, and relays the observation packet. Further, the receiving terminal writes into the observation packet degraded state information indicating a data loss rate between the transmitting terminal and the receiving terminal, and returns the observation packet to the transmitting terminal. Hence, the transmitting terminal can specify a congested relay device out of the congested state information written in the observation packet. In addition, subtracting the congested state information from the degraded state information makes possible calculating a transmission error rate in the wireless ad-hoc network. Assigning, to data to be transmitted, a forward error correction code suitable for the transmission error rate can realize high quality transmission.

Moreover, the embodiment allows the transmitting terminal to transmit the observation packet when a change occurs in a reception state of the data. Hence, the present invention makes possible preventing the transmitting terminal from unnecessarily transmitting the observation packet, and alleviating loads provided to the network and to the terminal and the relay device.

Further, when receiving plural instructions (trigger packets) for transmitting an observation packet to be transmitted from the same source to the same destination in a short period of time, the relay device keeps one of the trigger packets and discards the rest. This can prevent two or more trigger packets having the same details from being transmitted towards the transmitting terminal. This can alleviate loads delivered to the network, the terminal, and the relay device.

Between the transmitting and receiving terminals connected to the relay device, moreover, the present invention selects intensity and a technique of a forward error correction based on a transmission error, and controls a transmission rate comprehending a degree of an effect of each of congestion and the transmission error. This allows the present invention to realize high quality video transmission.

Although only an exemplary embodiment of this invention have been described in detail above, those skilled in the art will readily appreciate that many modifications are possible in the exemplary embodiment without materially departing from the novel teachings and advantages of this invention. Accordingly, all such modifications are intended to be included within the scope of this invention.

A relay transmission technique in the present invention realizes transmission of videos and speeches in high quality with a use of an ad-hoc network, and is applicable to an indoor monitoring system, a street monitoring system and the Intelligent Transport Systems (ITS). In addition, the relay transmission technique, applicable to transmitting various kinds of media including text, still pictures, and music, in addition to videos and speeches, can perform indoor as well as outdoor media transmission in high quality.

The invention claimed is:

1. A data transmitting and receiving system, comprising:
   a relay device configured to be connected to an ad-hoc network; and
   a first terminal and a second terminal each of which transmits and receives data via the relay device,
   wherein the relay device includes:
   a receiving unit configured to receive an observation packet used for observing transmission quality, and data;
   a reception buffer in which the data is stored;
   a reception buffer managing unit configured to observe a loss rate of the data in the reception buffer;
   a packet information rewriting unit configured to write the loss rate into the observation packet as congested state information, the loss rate being observed by the reception buffer managing unit;
   a transmission buffer configured to store on a destination basis the data stored in the reception buffer;
   a transmission buffer managing unit configured to forward the data stored in the transmission buffer at a predetermined transmission rate on the destination basis; and
   a transmitting unit configured to transmit towards a destination the data forwarded by the transmission buffer managing unit, and the observation packet,
   the first terminal includes:
   a first transmitting and receiving unit configured to transmit and receive data and the observation packet; and
   a first transmission quality managing unit configured to write degraded state information in the observation packet, the degraded state information indicating the loss rate of the data between the first terminal and the second terminal, and
   the second terminal includes:
   a second transmitting and receiving unit configured to transmit and receive data and the observation packet;
   a second transmission quality managing unit configured to calculate a transmission error rate of the data in the data transmitting and receiving system by subtracting the loss rate indicated in the congested state information from the loss rate indicated in the degraded state, the loss rates being included in the observation packet obtained from the first terminal; and
   an error correction processing unit configured to execute processing on data to be transmitted, so that an error of the data is corrected when the data is received, the processing being executed according to the transmission error rate calculated by the second transmission quality managing unit.

2. The data transmitting and receiving system according to claim 1,
   wherein the error correction processing unit is configured to determine forward error correction capability according to the transmission error rate calculated by the second transmission quality managing unit so as to assign, to the data to be transmitted, a forward error correction code based on the forward error correction capability.

3. The data transmitting and receiving system according to claim 1,
wherein the first terminal further includes a first terminal reception state managing unit configured to detect a change of a reception state of the data in the first transmitting and receiving unit, and, in the case where the change of the reception state is determined, to instruct the first transmission quality managing unit to transmit the observation packet,
the second terminal further includes a second terminal reception state managing unit configured to detect a change of a reception state of the data in the second transmitting and receiving unit, and, in the case where the change of the reception state is determined, to instruct the second transmission quality managing unit to transmit the observation packet,
the first transmission quality managing unit is configured to transmit, via the first transmitting and receiving unit, the observation packet towards a terminal of a destination of the data in response to the instruction from the first terminal reception state managing unit so as to transmit the observation packet, and
the second transmission quality managing unit is configured to transmit, via the second transmitting and receiving unit, the observation packet towards a terminal of a destination of the data in response to the instruction from the second terminal reception state managing unit so as to transmit the observation packet.

4. The data transmitting and receiving system according to claim 3,
wherein each of the reception states of the data includes at least one of reception field intensity, detection of notification information of handover, a transmission speed, a selected forward error correction technique or selected intensity, a transmission error rate of the data, and a number of retransmissions of the data.

5. The data transmitting and receiving system according to claim 3,
wherein the first terminal reception state managing unit is configured to detect a change of the loss rate of the data indicated in the congested state information or the degraded state information included in the observation packet, and, in the case where the change of the loss rate of the data is detected, to instruct the first transmission quality managing unit so as to transmit the observation packet, and
the second terminal reception state managing unit is configured to detect the change of the loss rate of the data indicated in the congested state information or the degraded state information included in the observation packet, and, in the case where the change of the loss rate of the data is detected, to instruct the second transmission quality managing unit so as to transmit the observation packet.

6. The data transmitting and receiving system according to claim 1,
wherein the relay device further includes a relay device reception state managing unit configured to detect a change of a reception state of the data in the receiving unit, and, in the case where the change of the reception state is determined, to instruct the second transmission quality managing unit so as to transmit the observation packet, and
the second transmission quality managing unit is configured to transmit, via the second transmitting and receiving unit, the observation packet towards the first terminal in response to the instruction from the relay device reception state managing unit so as to transmit the observation packet.

7. The data transmitting and receiving system according to claim 6,
wherein the relay device further includes:
a routing processing unit configured to generate a routing table indicating a transmission path of the data, using a predetermined routing protocol; and
a destination distributing unit configured to determine a next destination of the data according to the routing table,
the transmission buffer managing unit is configured to transmit the data towards the destination determined by the destination distributing unit via the transmitting unit, and
the relay device reception state managing unit is configured to detect renewal of the routing table by the routing processing unit, and, in the case where the renewal of the routing table is determined, to instruct the second transmission quality managing unit so as to transmit the observation packet.

8. The data transmitting and receiving system according to claim 6,
wherein the relay device reception state managing unit is configured to detect the change of the loss rate of the data indicated in the congested state information included in the observation packet, and, in the case where the change of the loss rate of the data is determined, to instruct the second transmission quality managing unit so as to transmit the observation packet.

9. The data transmitting and receiving system according to claim 6,
wherein, in the case where the receiving unit receives within a predetermined time period a plurality of instructions including the instruction for transmitting the observation packet from a same source to a same destination, the relay device reception state managing unit is configured to execute one of the instructions on the second transmission quality managing unit, and to discard remaining instructions out of the instructions.

10. A terminal, connected to a relay device via an ad-hoc network, which transmits to and receives data from another terminal via the relay device, the terminal comprising:
a transmitting and receiving unit configured to transmit and receive data and an observation packet used for observing transmission quality;
a transmission quality managing unit configured to write degraded state information in the observation packet received by the transmitting and receiving unit from the another terminal via the rely device, and to cause the transmitting and receiving unit to transmit, via the relay device, the observation packet in which the degraded state information is written to the another terminal, the degraded state information indicating a loss rate of the data between the terminal and the another terminal; and
a reception state managing unit configured to detect a change of a reception state of the data in the transmitting and receiving unit,
wherein, in the case where the reception state managing unit detects the change of the reception state, the transmission quality managing unit is configured to transmit a trigger packet to the another terminal via the relay device, the trigger packet indicating an instruction for transmitting a new observation packet.

11. A relay device, connected to a terminal via an ad-hoc network, which relays data transmitted to and received from terminals including the terminal, the relay device comprising:
- a receiving unit configured to receive an observation packet used for observing transmission quality, and data;
- a reception buffer in which the data is stored;
- a reception buffer managing unit configured to observe a loss rate of the data in the reception buffer;
- a packet information rewriting unit configured to write the loss rate into the observation packet as congested state information, the loss rate being observed by the reception buffer managing unit;
- a transmission buffer configured to store the data stored in the reception buffer on a destination basis;
- a transmission buffer managing unit configured to forward the data stored in the transmission buffer at a predetermined transmission rate on a destination basis;
- a transmitting unit configured to transmit towards a destination the data forwarded by the transmission buffer managing unit, and the observation packet; and
- a reception state managing unit configured to detect a change of a reception state of the data in the receiving unit, and, in the case where the change of the reception state is determined, to instruct the terminal which transmits the data so as to transmit the observation packet.

12. A data transmission method for a system which includes a relay device, a transmitting terminal, and a receiving terminal that are connected to an ad-hoc network, and transmits data from the transmitting terminal to the receiving terminal via the relay device, the data transmission method comprising:
- transmitting data from the transmitting terminal to the relay device towards the receiving terminal;
- relaying the data by the relay device;
- receiving the data by the receiving unit;
- transmitting an observation packet used for observing transmission quality from the transmitting terminal to the relay device towards the receiving terminal;
- receiving the observation packet by the relay device, writing a loss rate of the data in the observation packet as congested state information, and transmitting the observation packet towards the receiving terminal;
- receiving the observation packet transmitted from the relay device by the receiving terminal, writing a loss rate of the data into the observation packet as degraded state information, the data regarding between the transmitting terminal and the receiving terminal, and transmitting the observation packet towards the transmitting terminal; and
- calculating a transmission error rate of the data in the system by the transmitting terminal receiving the observation packet having the congested state information and the degraded state information, and subtracting the congested state information from the degraded state information included in the received observation packet.

* * * * *